(12) United States Patent
Yasunaga

(10) Patent No.: US 7,446,914 B2
(45) Date of Patent: Nov. 4, 2008

(54) IMAGE PROCESSING APPARATUS

(75) Inventor: Masaaki Yasunaga, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 660 days.

(21) Appl. No.: 11/080,847

(22) Filed: Mar. 16, 2005

(65) Prior Publication Data
US 2006/0209369 A1 Sep. 21, 2006

(51) Int. Cl.
H04N 1/46 (2006.01)

(52) U.S. Cl. .............. 358/538; 358/448; 358/450; 358/452; 358/453; 382/176

(58) Field of Classification Search .............. 358/1.9, 358/2.1, 448, 450, 452, 453, 464, 462, 538; 382/175–177, 180
See application file for complete search history.

(56) References Cited

U.S. PATENT DOCUMENTS

| | | | | |
|---|---|---|---|---|
| 5,689,342 A * | 11/1997 | Nakatsuka | ............... | 358/448 |
| 5,867,593 A * | 2/1999 | Fukuda et al. | ............... | 382/176 |
| 5,991,515 A * | 11/1999 | Fall et al. | ............... | 358/1.15 |
| 6,965,457 B2 * | 11/2005 | Nakanishi et al. | ............... | 358/462 |
| 7,123,291 B2 * | 10/2006 | Horie | ............... | 382/284 |
| 7,139,019 B2 * | 11/2006 | Kondo et al. | ............... | 348/222.1 |
| 7,173,731 B2 * | 2/2007 | Tanaka | ............... | 382/164 |
| 2002/0003897 A1 * | 1/2002 | Tanaka | ............... | 382/282 |
| 2003/0107781 A1 * | 6/2003 | Ozawa | ............... | 358/538 |
| 2004/0047513 A1 * | 3/2004 | Kondo et al. | ............... | 382/173 |
| 2004/0062450 A1 * | 4/2004 | Kondo et al. | ............... | 382/266 |
| 2004/0095601 A1 * | 5/2004 | Ozawa | ............... | 358/1.15 |
| 2004/0136609 A1 * | 7/2004 | Ichikawa et al. | ............... | 382/173 |
| 2005/0111734 A1 * | 5/2005 | Watanabe | ............... | 382/173 |
| 2006/0133679 A1 * | 6/2006 | Yoshida | ............... | 382/239 |
| 2006/0209311 A1 * | 9/2006 | Megawa et al. | ............... | 358/1.1 |
| 2007/0002065 A1 * | 1/2007 | Otake et al. | ............... | 345/581 |
| 2007/0230806 A1 * | 10/2007 | Kimura | ............... | 382/238 |
| 2008/0031549 A1 * | 2/2008 | Konishi et al. | ............... | 382/305 |

FOREIGN PATENT DOCUMENTS

| | | |
|---|---|---|
| JP | 5-225378 A | 9/1993 |
| JP | 2000-20726 A | 1/2000 |
| JP | 3023374 B2 | 1/2000 |
| JP | 2006260569 A * | 9/2006 |

* cited by examiner

Primary Examiner—Kimberly A Williams
(74) Attorney, Agent, or Firm—Foley & Lardner LLP

(57) ABSTRACT

An image processing section receives a region "each bitmap data and region attribute (character region, etc.)" from an image separation section, subjects each bitmap to processes for binarization, compression, OCR, etc., and outputs post-processing "each image data and region attribute (text information, meta-information, etc.)". A region integration section receives the "each image data and region attribute (text information, meta-information, etc.)" from the image processing section, integrates it with image data of the same attribute, which is designated (manually) from an operation panel, on a bitmap level, and outputs "integrated bitmap data and region attribute (text information, meta-information, etc.)".

19 Claims, 10 Drawing Sheets

Respective regions are grouped by group number

IMAGE PROCESSING APPARATUS

BACKGROUND OF THE INVENTION

1. Field of the Invention

The present invention relates to an image processing apparatus that subjects image data to image processing.

2. Description of the Related Art

In the prior art, with the development in digital technology, an increasing number of documents have been digitized and the management of these digitized documents has posed an important problem.

Under the circumstances, image data is divided into regions by image region discrimination or layout analysis, and each divided region is subjected to image processing. Thereby, character information is detected. However, such image region discrimination information has not effectively been used in most cases.

Jpn. Pat. Appln. KOKAI Publication No. 4-160981 (Document 1), for instance, discloses that at least two regions, that is, a character region and a gray-scale region of an original image, are separated from image data, and the respective regions are individually subjected to image processing.

Jpn. Pat. Appln. KOKAI Publication No. 5-225378 (Document 2) discloses that an input document is segmented into blocks, and each block is classified into a photo part, a character part or a background part by a threshold-value process. Neighboring blocks, which are classified into the same kind, are integrated into an independent region.

Jpn. Pat. Appln. KOKAI Publication No. 2000-20726 (Document 3) discloses that a character string region is extracted from a character region extraction section and a specific region extraction section for, e.g. a photo or a figure/table.

In Document 1, image data is divided into regions and an image of each region is subjected to image processing. However, layout information at the time of dividing the image data into regions is not effectively used.

In Document 2, an input document is divided into a plurality of blocks, and each block is classified into a photo part, a character part, a background part, etc. However, there is a problem relating to the size of block. In addition, there is such a problem that only neighboring blocks can be integrated.

In Document 3, a character string region is extracted from the character region extraction section and the specific region extraction section for, e.g. a photo or a figure/table. However, Document 3 is silent on other effective methods of use.

BRIEF SUMMARY OF THE INVENTION

The object of an aspect of the present invention is to provide an image processing apparatus that effectively integrates or groups regions by using image region discrimination information, thereby improving document management and performance.

According to an aspect of the present invention, there is provided an image processing apparatus comprising: an image input section that receives image data; an image region discrimination section that executes image region discrimination using the image data that is input from the image input section; an image separation section that provides the image data of each of regions with attribute information of the associated region on the basis of the image data, which is input from the image input section, and an image region discrimination result from the image region discrimination section; an image processing section that executes an image process for the image data of each region, which is provided with the attribute information that is output from the image separation section; and a region integration section that integrates a plurality of regions on the basis of the image data of each region, which is subjected to the image process in the image processing section, and the provided attribute information.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

Embodiments of the present invention will now be described with reference to the accompanying drawings.

Figure 1:
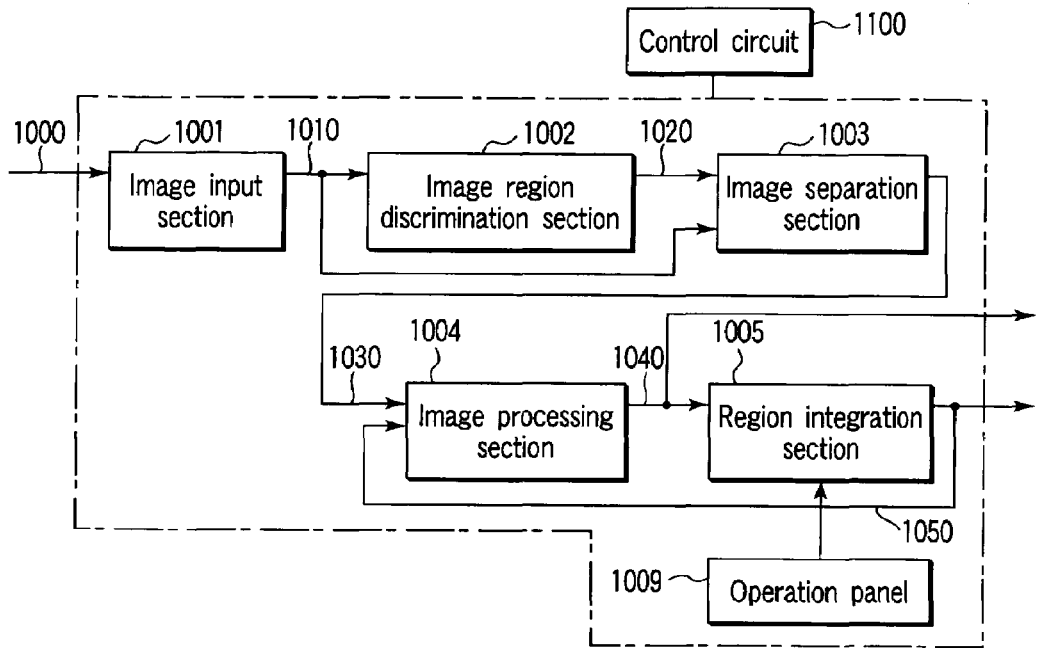
FIG. 1 is a block diagram that schematically shows the structure of an image processing apparatus according to a first embodiment of the present invention.

FIG. 1 schematically shows the structure of an image processing apparatus according to a first embodiment of the present invention. The image processing apparatus according to the first embodiment comprises an image input section 1001, an image region discrimination section 1002, an image separation section 1003, an image processing section 1004, a region integration section 1005, an operation panel 1009, and a control circuit 1100.

The image input section 1001 receives a paper chart 1000 and outputs digital data.

The image region discrimination section 1002 discriminates how a picture/photo and a character is arranged on digital data 1010 that is output from the image input section 1001. The image region discrimination section 1002 outputs an image region discrimination result 1020.

The image separation section 1003 receives the digital data 1010 from the image input section 1001, and the image region discrimination result 1020 from the image region discrimination section 1002, and outputs a picture/photo or character region "each bitmap data and region attribute (character region, etc.)" 1030.

The image processing section 1004 receives the region "each bitmap data and region attribute (character region, etc.)" 1030 from the image separation section 1003, subjects each bitmap to processes for binarization, compression, OCR, etc., and outputs post-processing "each image data and region attribute (text information, meta-information, etc.)" 1040.

The region integration section 1005 receives the "each image data and region attribute (text information, meta-information, etc.)" 1040 from the image processing section 1004, integrates it with image data of the same attribute, which is designated (manually) from the operation panel 1009, on a bitmap level, and outputs "integrated bitmap data and region attribute (text information, meta-information, etc.)" 1050.

The control circuit 1100 executes an overall control of the image processing apparatus.

In the first embodiment, the image input section 1001 has a structure of a conventional scanner or copying machine. Except the region integration section 1005, the structural elements have conventional structures.

Next, the region integration section 1005 that is the characteristic point of the present invention is described referring to FIGS. 2 to 5.

The "each image data and region attribute (text information, meta-information, etc.)" 1040, which is input to the region integration section 1005, includes each image data, attribute information of a region of a character, a photo, etc., and, in some cases, text information or meta-information of a character that is described in the image data.

The "each image data and region attribute (text information, meta-information, etc.)" 1040 is hereinafter referred to as "region image data 1040".

Figure 2:
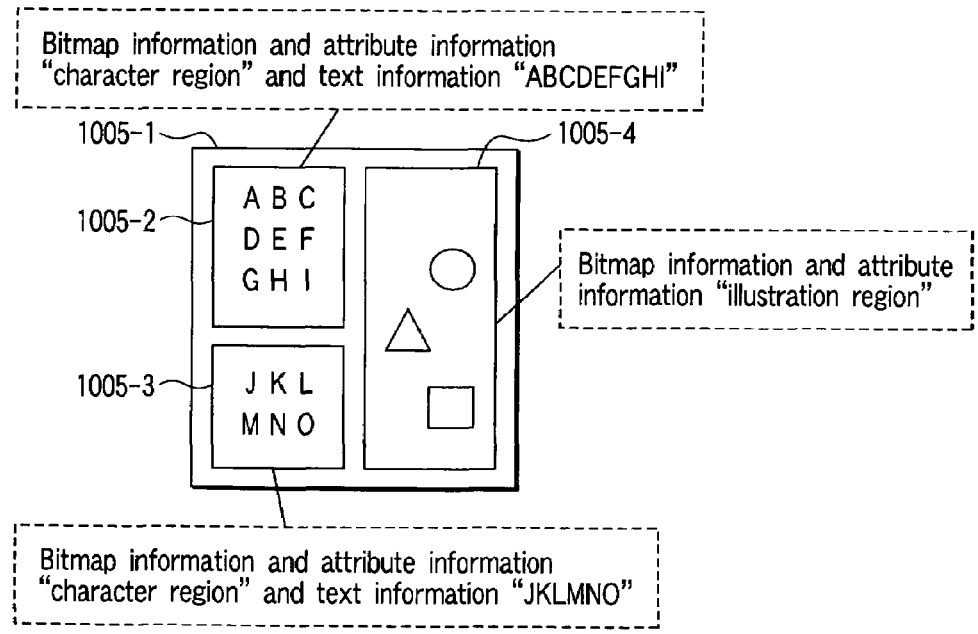
FIG. 2 shows the state of a document prior to integration of regions.

Assume now that there is a document 1005-1, as shown in FIG. 2.

The document 1005-1 includes region image data 1005-2 with character attribute image data, region image data 1005-3 with character attribute image data, and region image data 1005-4 with photo attribute image data.

Figure 3:
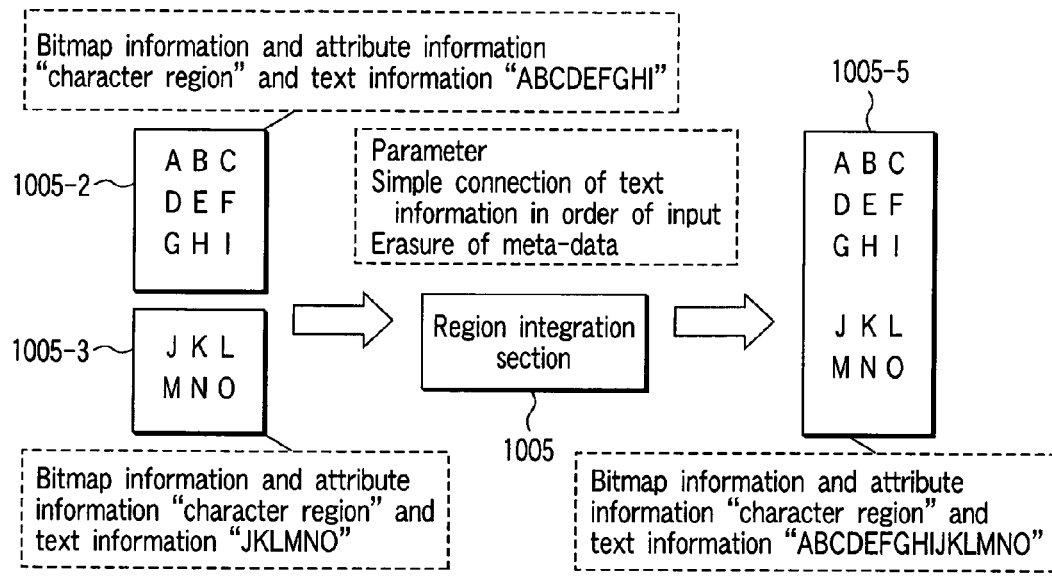
FIG. 3 shows the state of a document during integration of regions.

FIG. 3 illustrates transmission/reception of information in a simple fashion.

In this case, the region image data 1005-2 and region image data 1005-3, which have the same character attribute, can be integrated. The region integration section 1005 integrates the region image data 1005-2 and region image data 1005-3 into region image data 1005-5. The region image data to be integrated are manually set from the operation panel 1009.

Figure 4:
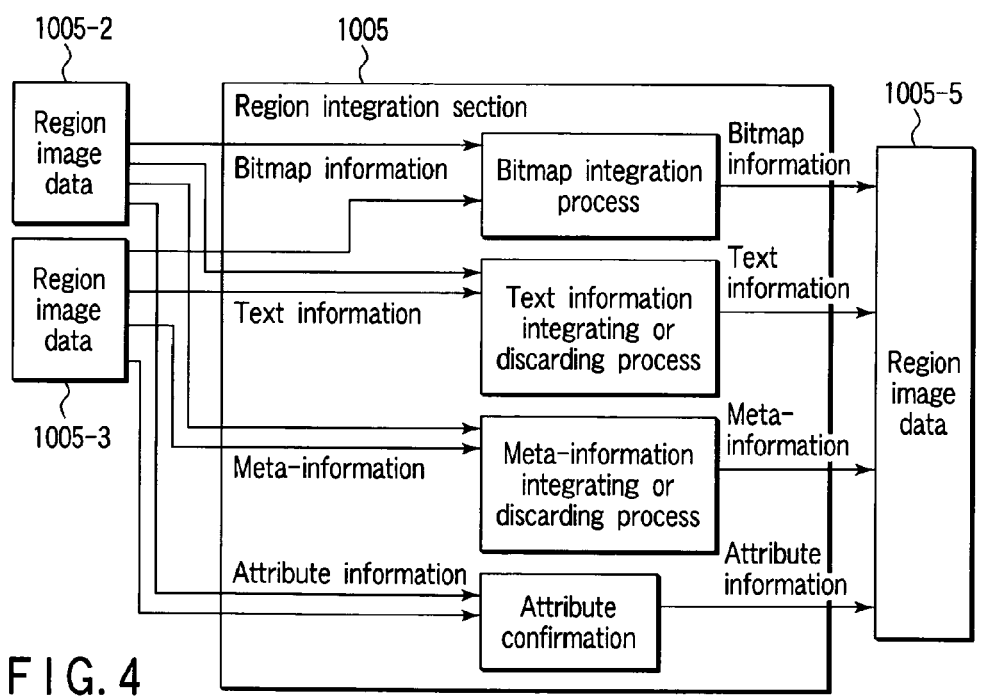
FIG. 4 is a view for describing details of a region integration section.

FIG. 4 shows an example of configuration for reception/transmission of information.

The region integration section 1005 executes a bitmap integration process for bitmap information of the region image data 1005-2 and region image data 1005-3, and converts the bitmap information to region image data 1005-5.

In addition, the region integration section 1005 executes a text information integration or discarding process for text information of the region image data 1005-2 and region image data 1005-3, and converts the text information to the region image data 1005-5.

Further, the region integration section 1005 executes a meta-information integration or discarding process for meta-information (e.g. title) of the region image data 1005-2 and region image data 1005-3, and converts the meta-information to the region image data 1005-5.

Moreover, the region integration section 1005 executes attribute confirmation for attribute information of the region image data 1005-2 and region image data 1005-3, and converts the attribute information to the region image data 1005-5.

In short, the region image data 1005-5 comprises the integrated bitmap information, text information, meta-information and attribute information.

Figure 5:
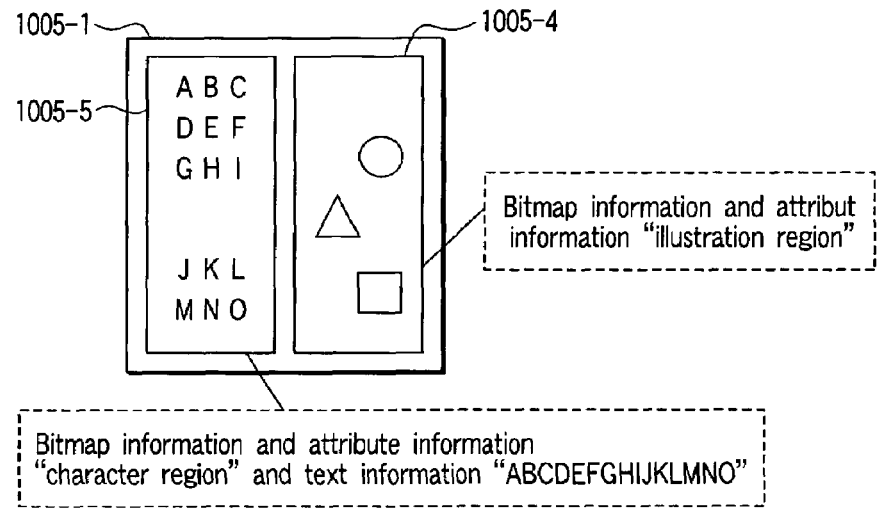
FIG. 5 shows the state of a document after integration of regions.

The region image data 1005-2 and region image data 1005-3 are integrated to produce region image 1005-5, as shown in FIG. 5, which is composed of image data with a new character attribute.

The region integration section 1005 thus integrates region image data of the same attribute on a bitmap level. If pre-integration region image data includes sub-information such as text information or meta-information, it is possible to erase or merge it at the stage of executing integration.

As has been described above, according to the first embodiment, effective compression can be executed by the image region integration section 1005, and document information can be rearranged for an easier subsequent process.

Next, a second embodiment of the invention is described.

Figure 6:
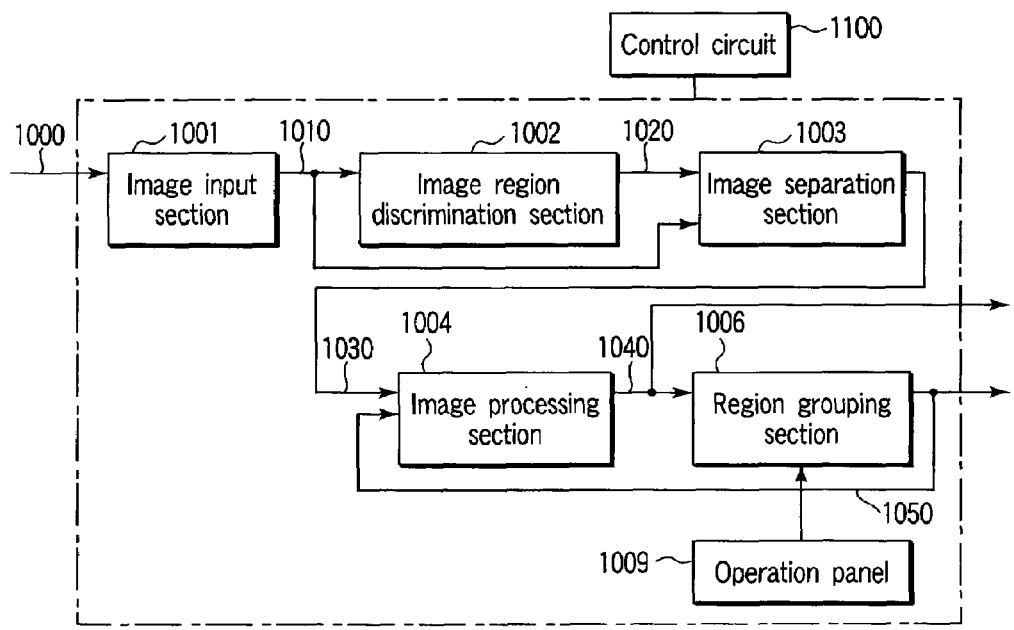
FIG. 6 is a block diagram that schematically shows the structure of an image processing apparatus according to a second embodiment of the invention.

FIG. 6 schematically shows the structure of an image processing apparatus according to the second embodiment. The image processing apparatus according to the second embodiment comprises an image input section 1001, an image region discrimination section 1002, an image separation section 1003, an image processing section 1004, a region grouping section 1006, an operation panel 1009, and a control circuit 1100. Except the region grouping section 1006, the structural elements are the same as those in the first embodiment. The parts common to the first embodiment are denoted by like reference numerals, and a description thereof is omitted.

Figure 7:
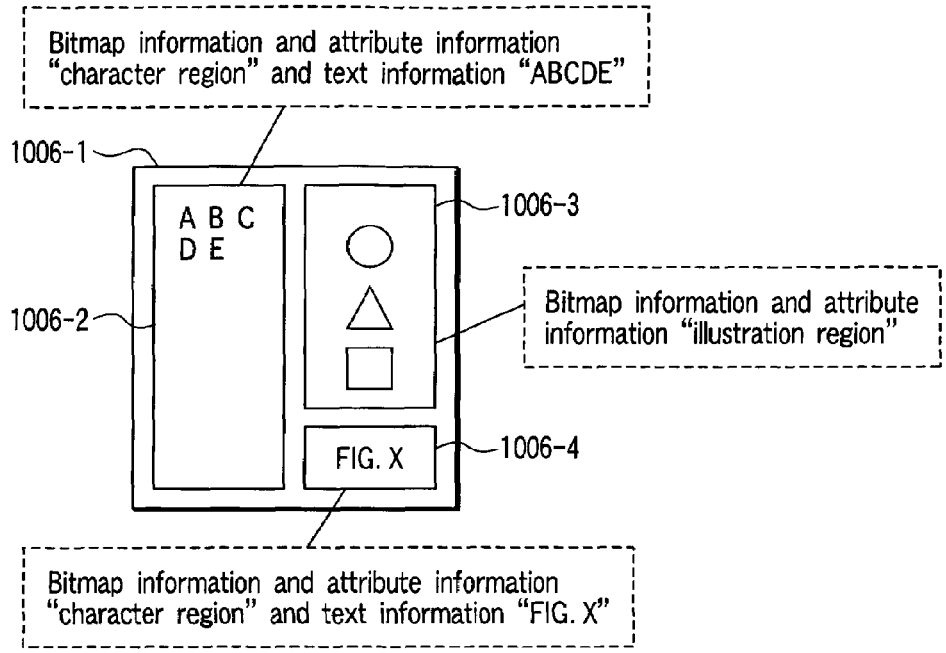
FIG. 7 shows the state of a document prior to grouping of regions.
Figure 8:
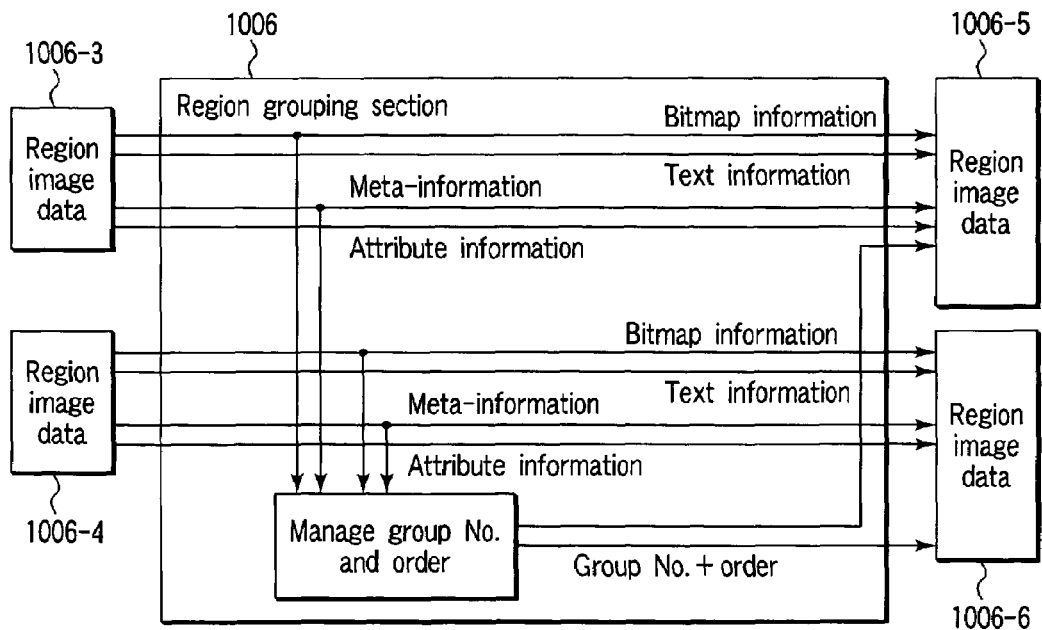
FIG. 8 is a view for describing details of a region grouping section.
Figure 9:
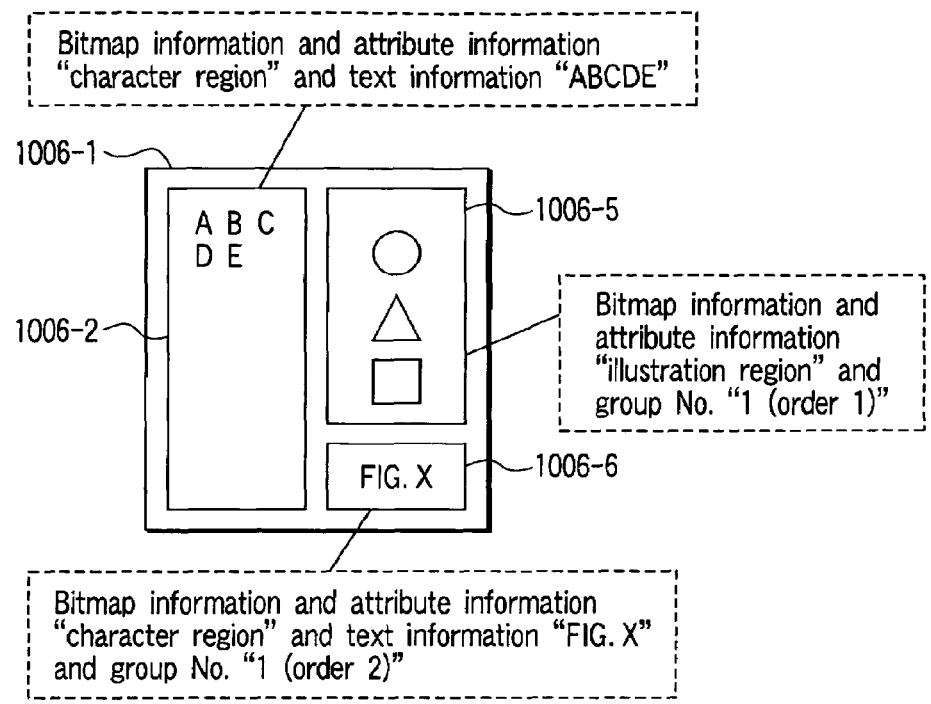
FIG. 9 shows the state of a document after grouping of regions.

The region grouping section 1006 that is the characteristic point of the present invention is described referring to FIGS. 7 to 9.

A region image 1040 that is input to the region grouping section 1006 includes a region image (bitmap), and its attribute (character, photo/figure/table), meta-information, and text information.

Assume now that there is a document 1006-1 as shown in FIG. 7. The document 1006-1 includes region image data 1006-2 with a character attribute image, region image data 1006-3 with a photo attribute image, and region image data 1006-4 with a character attribute image.

Suppose that the region image 1006-4 includes a figure number and a figure title, which are indicative of the region image 1006-3. In this case, the region image 1006-3 and region image 1006-4 have different attributes (photo and character), but have a very close correlation. If a correlation between regions is determined as in this case, both regions can be grouped.

As is shown in FIG. 8 and FIG. 9, group information indicative of a correlation is added to the region image 1006-3 and region image 1006-4, without integrating their bitmaps attributes, text information and meta-data.

The region grouping section 1006 manages a group number and an order with respect to the bitmap information and meta-information of the region image data 1006-3 and region image data 1006-4, and adds the group number and order to region image data 1006-5 and region image data 1006-6.

As shown in FIG. 9, the region grouping section 1006 can indicate correlation between regions, without varying the information of the region image data. The correlation, in this context, includes, e.g. the order of grouping.

As has been described above, according to the second embodiment, the region grouping section 1006 can provide correlation to respective region image data without varying the information of the region image data. The correlation can effectively be provided, for example, in cases where the compression ratio is degraded if region image data are integrated as in the first embodiment, where attributes are different, and where the positions of the respective regions are apart from each other.

Next, a third embodiment of the invention is described.

Figure 10:
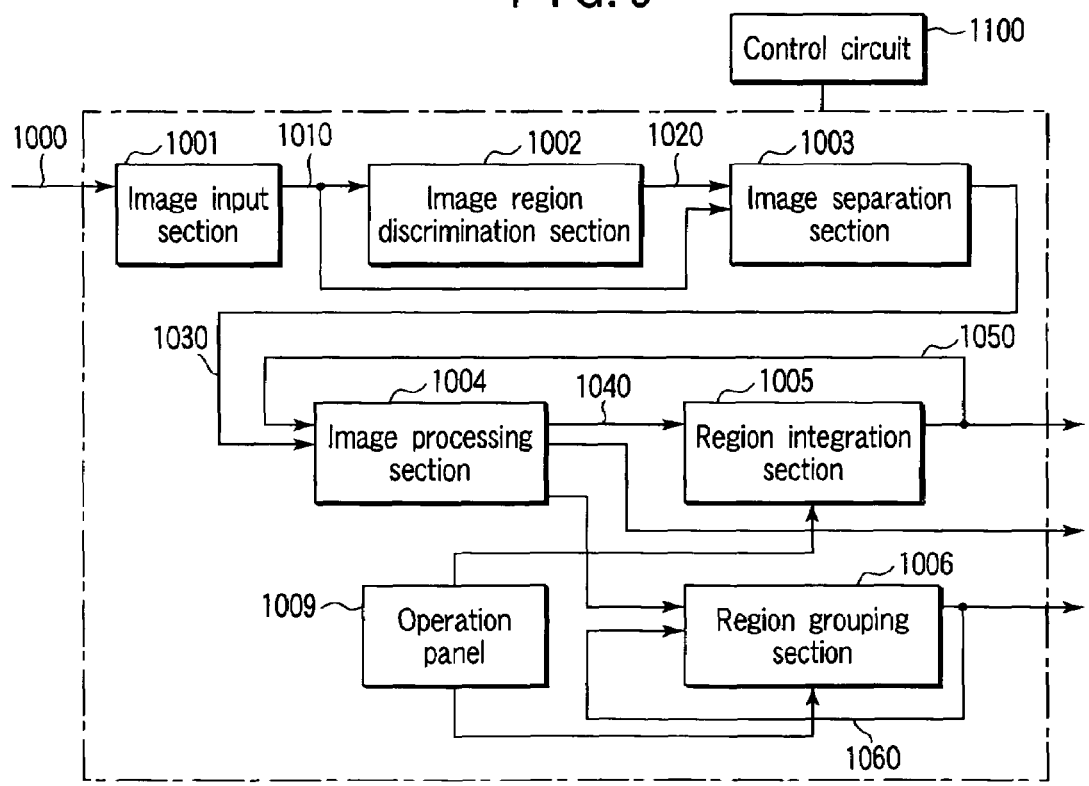
FIG. 10 is a block diagram that schematically shows the structure of an image processing apparatus according to a third embodiment of the invention.

FIG. 10 schematically shows the structure of an image processing apparatus according to the third embodiment. The image processing apparatus according to the third embodiment comprises an image input section 1001, an image region discrimination section 1002, an image separation section 1003, an image processing section 1004, a region integration section 1005, a region grouping section 1006, an operation panel 1009, and a control circuit 1100. The parts common to the first and second embodiments are denoted by like reference numerals, and a description thereof is omitted.

The characteristic point of the third embodiment is that both the region integration section 1005 and region grouping section 1006 are provided. The operations of these sections are the same as those in the first and second embodiments, and a description is omitted.

As has been stated above, according to the third embodiment, by virtue of the provision of both the region integration section 1005 and region grouping section 1006, documents can be rearranged with higher flexibility and can efficiently be managed.

Next, a fourth embodiment of the invention is described.

Figure 11:
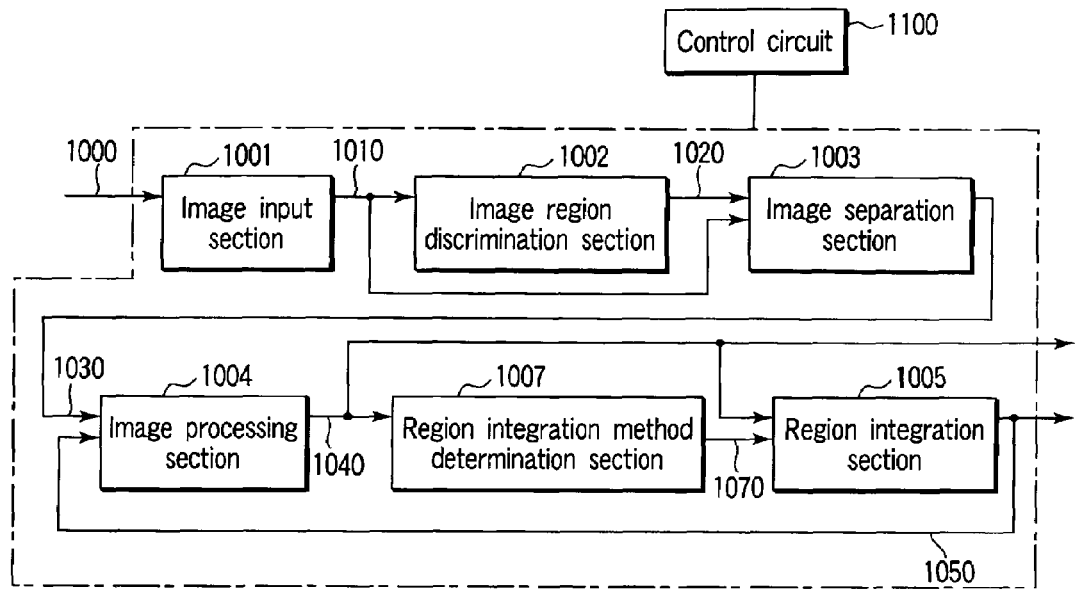
FIG. 11 is a block diagram that schematically shows the structure of an image processing apparatus according to a fourth embodiment of the invention.

FIG. 11 schematically shows the structure of an image processing apparatus according to the fourth embodiment. The image processing apparatus according to the fourth embodiment comprises an image input section 1001, an image region discrimination section 1002, an image separation section 1003, an image processing section 1004, a region integration section 1005, a region integration method determination section 1007, and a control circuit 1100. The parts common to those in the first embodiment are denoted by like reference numerals, and a description thereof is omitted.

The characteristic point of the fourth embodiment is the provision of the region integration method determination section 1007.

The region integration method determination section 1007 receives "each image data and region attribute (text information, meta-information, etc.)" 1040 from the image processing section 1004 and outputs information 1070 that is indicative of a method of integrating regions.

The region integration section 1005 receives the information 1070 indicative of the region integrating method from the region integration method determination section 1007, and the "each image data and region attribute (text information, meta-information, etc.)" 1040 from the image processing section 1004. The region integration section 1005 integrates image data of the same attribute, which is designated by the information 1070 indicative of the region integration method, on a bitmap level, and outputs "integrated bitmap data and region attribute (text information, meta-information, etc.)" 1050.

Figure 12:
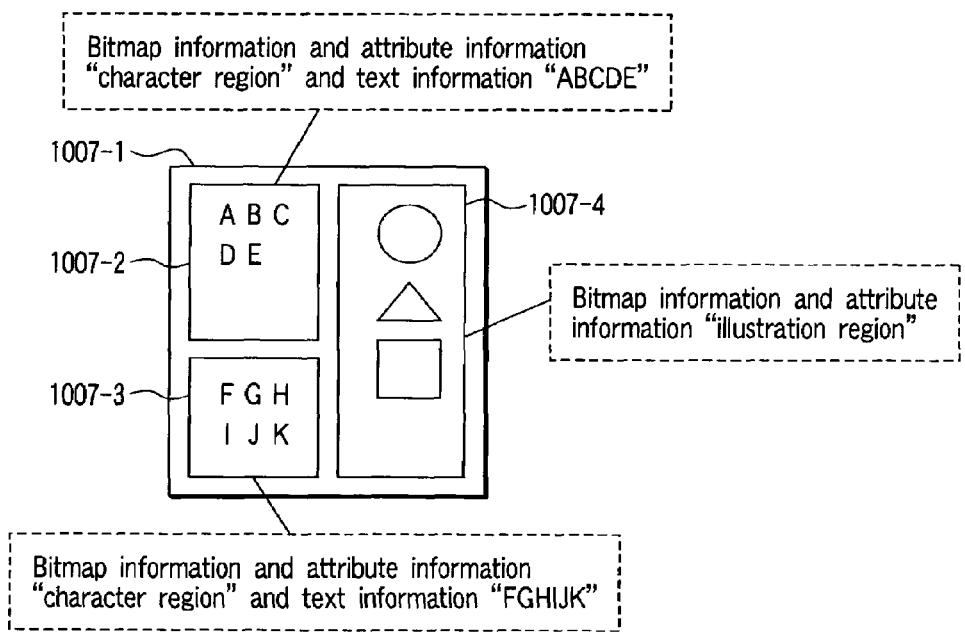
FIG. 12 shows the state of a document prior to integration of regions.
Figure 13:
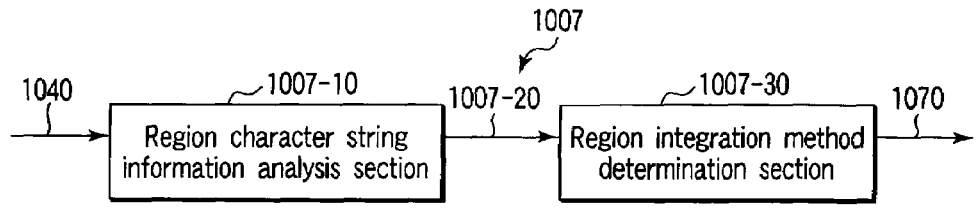
FIG. 13 shows an example of the structure of a region integration method determination section.

Referring now to FIGS. 12 and 13, the region integration method determination section 1007 is described.

The region image 1040, which is received from the region processing section 1004, includes a region image (bitmap), and its attribute (character, photo/figure/table), meta-information and text information.

Assume now that there is a document 1007-1, as shown in FIG. 12.

The document 1007-1 includes a region image 1007-2 with a character attribute image, a region image 1007-3 with a character attribute image, and a region image 1007-4 with a photo attribute image.

When the procedure in the first embodiment is performed for the document 1007-1, there arises no problem if a manual operation is executed. However, if automatic determination is to be executed, it is not understandable which regions may be integrated or not. The region integration method determination section 1007 determines which regions should be integrated with efficiency.

The region integration method determination section 1007, as shown in FIG. 13, includes a region character string information analysis section 1007-10 and a region integration method determination section 1007-30.

The region character string information analysis section 1007-10 extracts, as text information, character string information of a region image including a character attribute image (or extracts no information if the region image includes text information), and analyzes connection of region images of respective character attributes on the basis of the text.

The region integration method determination section 1007-30 determines a region integration method on the basis of a result from the region character string information analysis section 1007-10.

As has been described above, according to the fourth embodiment, documents can efficiently and automatically integrated by the region integration method determination section 1007.

Next, a fifth embodiment of the invention is described.

Figure 14:
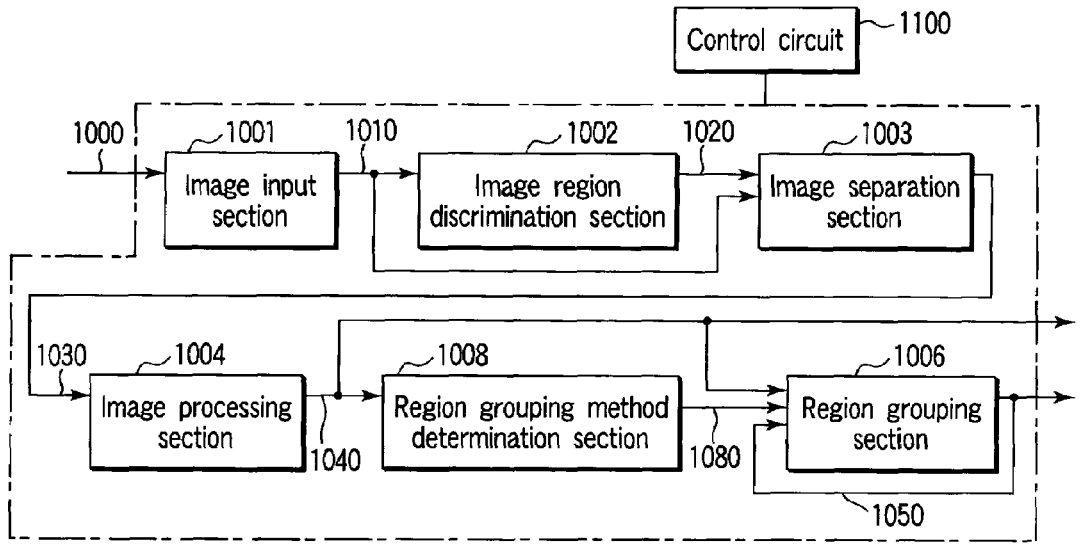
FIG. 14 is a block diagram that schematically shows the structure of an image processing apparatus according to a fifth embodiment of the invention.

FIG. 14 schematically shows the structure of an image processing apparatus according to the fifth embodiment. The image processing apparatus according to the fifth embodiment comprises an image input section 1001, an image region discrimination section 1002, an image separation section 1003, an image processing section 1004, a region grouping section 1006, a region grouping method determination section 1008 and a control circuit 1100. The parts common to those in the second embodiment are denoted by like reference numerals, and a description thereof is omitted.

The characteristic point of the fifth embodiment is the provision of the region grouping method determination section 1008.

The region grouping method determination section 1008 receives "each image data and region attribute (text information, meta-information, etc.)" 1040 from the image processing section 1004 and outputs information 1080 that is indicative of a method of grouping regions.

The region grouping section 1006 receives the information 1080 indicative of the region grouping method from the region grouping method determination section 1008, and the "each image data and region attribute (text information, meta-information, etc.)" 1040 from the image processing section 1004. The region grouping section 1006 groups region image data, which is designated by the information 1080 indicative of the region grouping method, and outputs each "bitmap data, region attribute (text information, meta-information, etc.) and group information" 1060.

Figure 15:
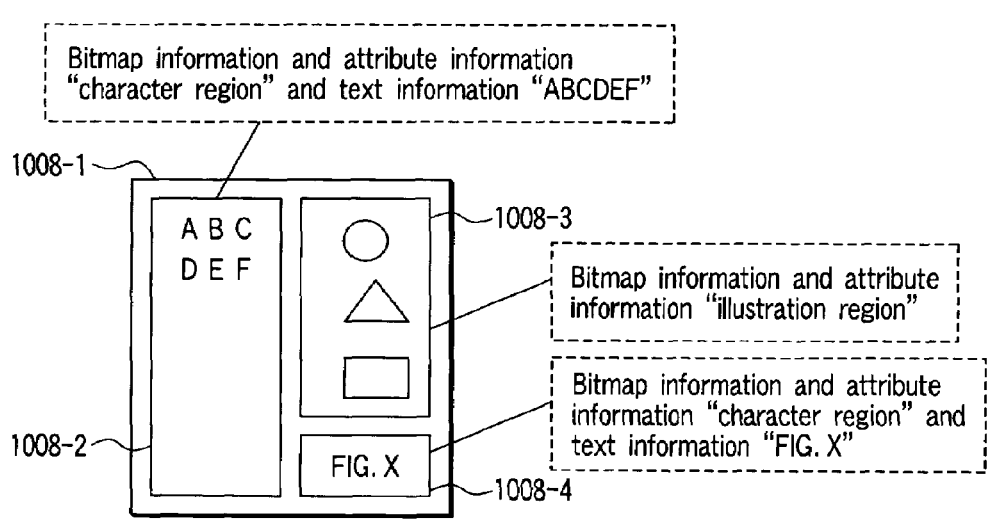
FIG. 15 shows the state of a document prior to grouping of regions.
Figure 16:
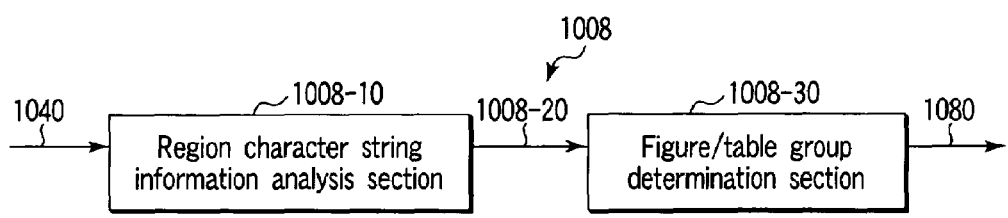
FIG. 16 shows an example of the structure of a region grouping method determination section.

Referring now to FIGS. 15 and 16, the region grouping method determination section 1008 is described.

The region image 1040, which is received from the region processing section 1004, includes a region image (bitmap), and its attribute (character, photo/figure/table), meta-information and text information.

Assume now that there is a document 1008-1, as shown in FIG. 15.

The document 1008-1 includes a region image 1008-2 with a character attribute image, a region image 1008-3 with a photo attribute image, and a region image 1008-4 with a character attribute image.

When the procedure in the second embodiment is performed for the document 1008-1, there arises no problem if a manual operation is executed. However, if automatic determination is to be executed, it is not understandable which regions should be grouped or not. The region grouping method determination section 1008 determines which regions should be grouped with efficiency.

The region grouping method determination section 1008, as shown in FIG. 16, includes a region character string information analysis section 1008-10 and a figure/table group determination section 1008-30.

The region character string information analysis section 1008-10 extracts, as text information, character string information of a region image including a character attribute image (or extracts no information if the region image includes text information).

When a figure number (including a figure title) or a table number (including a table title) is detected, the figure/table group determination section 1008-30 conducts a search for upper and lower ends of a region image having the figure number, etc. and executes determination to group a "region image with a figure and a figure number" or a "region image with a table and a table number".

As has been described above, according to the fifth embodiment, documents can efficiently and automatically be grouped by the region grouping method determination section 1008.

Next, a sixth embodiment of the invention is described.

Figure 17:
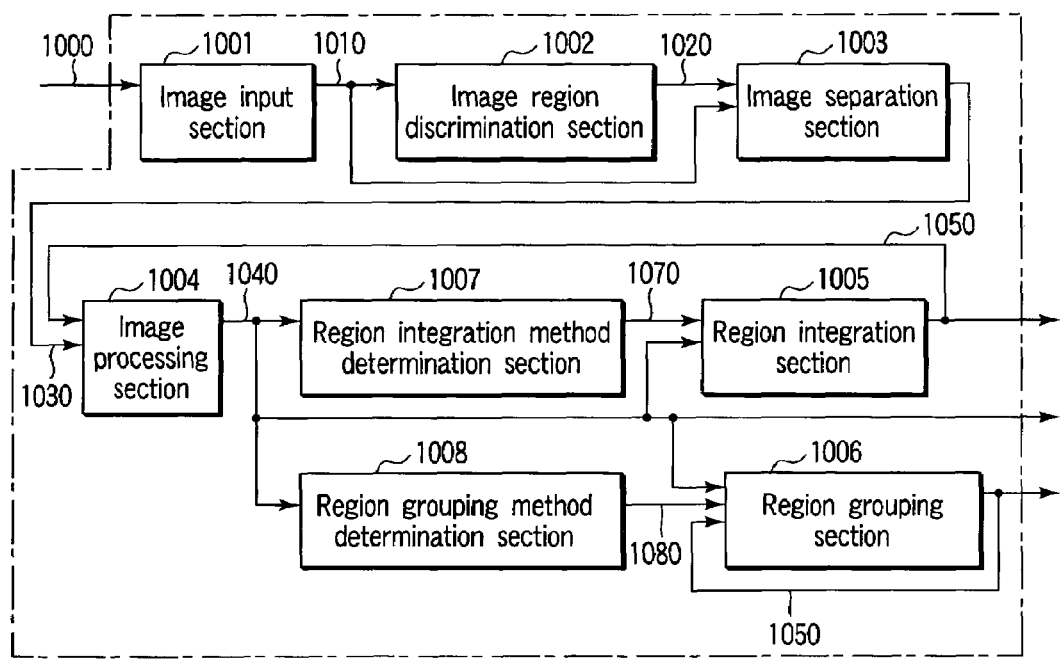
FIG. 17 is a block diagram that schematically shows the structure of an image processing apparatus according to a sixth embodiment of the invention.

FIG. 17 schematically shows the structure of an image processing apparatus according to the sixth embodiment. The image processing apparatus according to the sixth embodiment comprises an image input section 1001, an image region discrimination section 1002, an image separation section 1003, an image processing section 1004, a region integration section 1005, a region grouping section 1006, a region integration method determination section 1007, a region grouping method determination section 1008 and a control circuit 1100. The parts common to those in the fourth and fifth embodiments are denoted by like reference numerals, and a description thereof is omitted.

The characteristic point of the sixth embodiment is the provision of the region integration section 1005 and region grouping section 1006 and the provision of the region integration method determination section 1007 and region grouping method determination section 1008. The operations of these components are the same as in the fourth and fifth embodiments.

As has been described above, according to the sixth embodiment, by virtue of the provision of the region integration section 1005 and region grouping section 1006 and the provision of the region integration method determination section 1007 and region grouping method determination section 1008, documents can be rearranged with higher flexibility and can automatically and efficiently be managed.

Next, a seventh embodiment of the invention is described.

The seventh embodiment relates to an additional technique to the grouping in the second, third, fifth and sixth embodiments.

Figure 18:
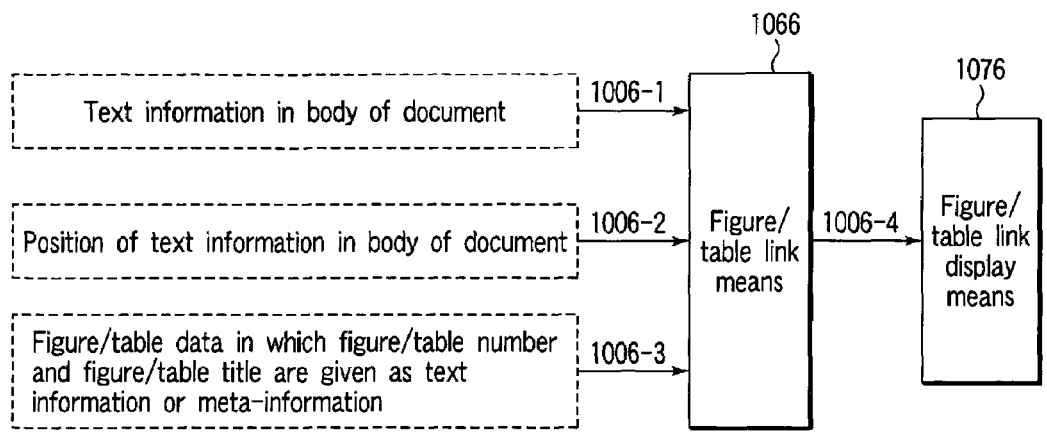
FIG. 18 shows an example of the structure according to a seventh embodiment of the invention.

FIG. 18 schematically shows the structure of the seventh embodiment. Specifically, the region grouping section 1006 is provided with figure/table link means 1066 and figure/table link display means 1076.

The figure/table link means 1066 receives text data 1006-1 in the body of a document, position information 1006-2 of text data in the body of the document and figure/table data 1006-3 in which a figure/table number or a figure/table title is given as text information or meta-information, and links a figure/table in the document and a figure/table number in the document.

The figure/table link display means 1076 displays such a link.

Figure 19:
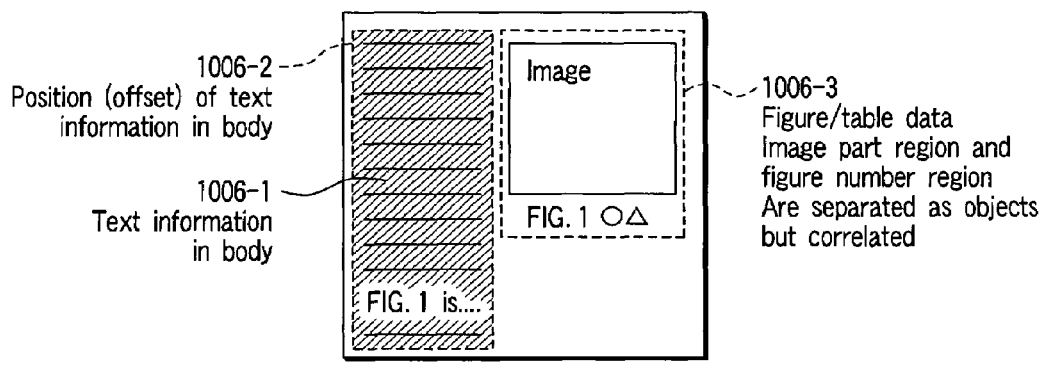
FIG. 19 shows an example of the structure of a document.
Figure 20:
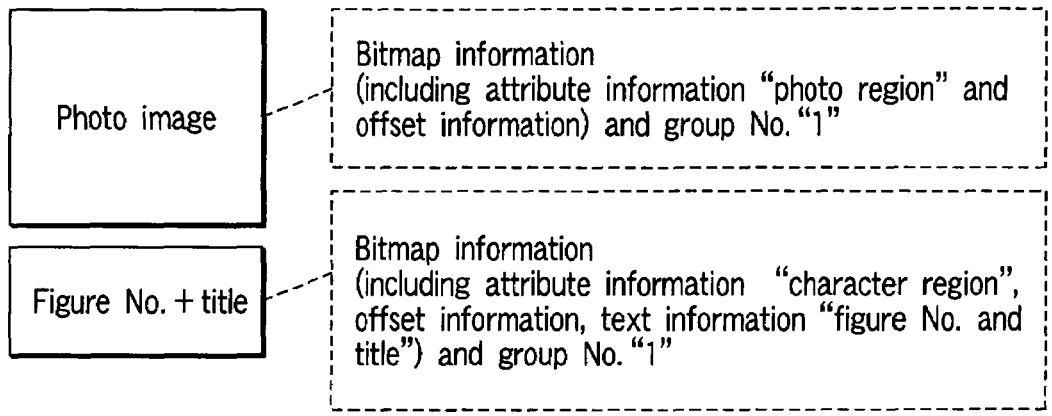
FIG. 20 shows an example of the structure of figure/table data.

FIG. 19 and FIG. 20 show examples of the structure of such a document.

In FIG. 19, text information 1006-1 in the body of a document, position information (offset) 1006-2 of text information in the body and figure/table data 1006-3 are displayed.

In the example of FIG. 20, a "photo image" and a "figure number and title" are treated as the same group. The figure/table link means 1066 provides a visual effect, for example, to make the following correlation understandable.

Figure 21:
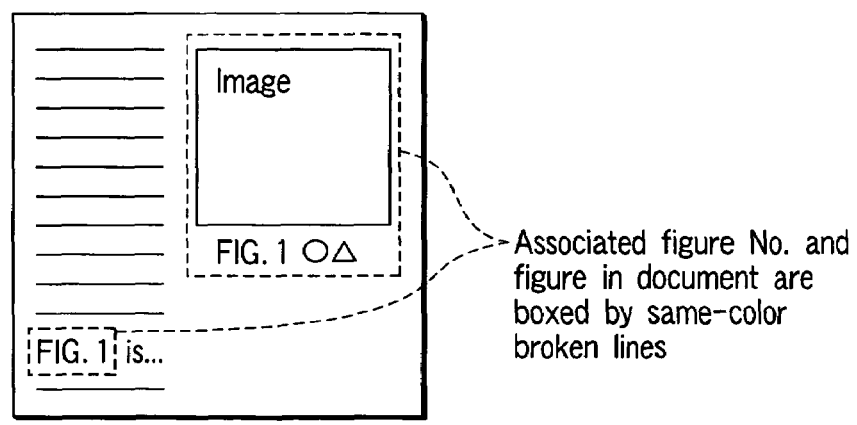
FIG. 21 shows an example of display on figure/table link display means.

In a first example, in FIG. 21, a figure/table number and a figure/table in a document are boxed with color broken lines. In a second example, when a cursor is brought to a figure/table number or title in a document, the associated figure/table is inverted or surrounded in a box. In a third example, if a figure/table number of title in a document is clicked, a jump is executed to the associated figure/table.

As has been described above, according to the seventh embodiment, the region grouping section 1006 is provided with the figure/table link means 1066 and figure/table link display means 1076. Thereby, the mutual relationship between the body and the figure/table can be made easier to understand.

Since a series of process procedures can be automated, the load on the user can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

an image input section that receives image data;

an image region discrimination section that executes image region discrimination using the image data that is input from the image input section;

an image separation section that provides the image data of each of regions with attribute information of the associated region on the basis of the image data, which is input from the image input section, and an image region discrimination result from the image region discrimination section;

an image processing section that executes an image process for the image data of each region, which is provided with the attribute information that is output from the image separation section; and a region integration section that integrates a plurality of regions on the basis of the image data of each region, which is subjected to the image process in the image processing section, and the provided attribute information, wherein the region integration section includes a region integration method determination section that determines which regions are to be integrated, on the basis of the image data of each region, which is processed by the image processing section, and the provided attributed information, and integrates a plurality of regions on the basis of a determination result of the region integration method determination section, wherein the region integration method determination section includes a region character string information analysis section that analyzes at least a meaning of a character string in the region.

2. The image forming apparatus according to claim 1, further comprising:

a region grouping section that groups a plurality of regions on the basis of the image data of each region, which is subjected to the image process in the image processing section, and the provided attribute information, wherein the region grouping section includes a region grouping method determination section that determines which regions are to be grouped, on the basis of the image data of each region, which is processed by the image processing section, and the provided attributed information, and groups a plurality of regions on the basis of a determination result of the region grouping method determination section.

3. The image forming apparatus according to claim 2, wherein the region grouping method determination section includes a region character string information analysis section that analyzes at least a meaning of a character string in the region, and a figure/table group determination section that provides a group candidate on the basis of a positional relationship between a figure table and a figure number.

4. The image forming apparatus according to claim 2, further comprising:

figure/table link means for imparting a correlation to a figure/table number and figure/table data in text data in the image data, on the basis of text data and position information in the image data and figure/table data in which a figure/table number and a figure/table title are given as text data; and figure/table link display means for displaying a correlative positional relationship that is linked by the figure/table link means.

5. An image processing apparatus comprising:

an image input section that receives image data;

an image region discrimination section that executes image region discrimination using the image data that is input from the image input section;

an image separation section that provides the image data of each of regions with attribute information of the associated region on the basis of the image data, which is input from the image input section, and an image region discrimination result from the image region discrimination section;

an image processing section that executes an image process for the image data of each region, which is provided with the attribute information that is output from the image separation section; and a region integration section that integrates a plurality of regions on the basis of the image data of each region, which is subjected to the image process in the image processing section, and the provided attribute information, wherein the region integration section outputs, as image data for each region, bitmap information by executing a bitmap integration process, text information by executing a text information integrating or discarding process, meta-information by executing a meta-information integrating or discarding process, and attribute information by executing attribute confirmation.

6. The image forming apparatus according to claim 5, further comprising:

a region grouping section that groups a plurality of regions on the basis of the image data of each region, which is subjected to the image process in the image processing section, and the provided attribute information.

7. The image forming apparatus according to claim 6, wherein the region grouping section groups a plurality of preset arbitrary regions.

8. The image forming apparatus according to claim 6, wherein the region grouping section provides the image data of each region with a group number and an order by grouping bitmap information, text information, meta-information, and attribute information.

9. The image forming apparatus according to claim 6, further comprising:

figure/table link means for imparting a correlation to a figure/table number and figure/table data in text data in the image data, on the basis of text data and position information in the image data and figure/table data in which a figure/table number and a figure/table title are given as text data; and figure/table link display means for displaying a correlative positional relationship that is linked by the figure/table link means.

10. An image processing apparatus comprising:

an image input section that receives image data;

an image region discrimination section that executes image region discrimination using the image data that is input from the image input section;

an image separation section that provides the image data of each of regions with attribute information of the associated region on the basis of the image data, which is input from the image input section, and an image region discrimination result from the image region discrimination section;

an image processing section that executes an image process for the image data of each region, which is provided with the attribute information that is output from the image separation section; and a region grouping section that groups a plurality of regions on the basis of the image data of each region, which is subjected to the image process in the image processing section, and the provided attribute information, wherein the region grouping section provides the image data of each region with a group number and an order by grouping bitmap information, text information, meta-information, and attribute information.

11. The image forming apparatus according to claim 10, further comprising:

a region integration section that integrates a plurality of regions on the basis of the image data of each region, which is subjected to the image process in the image processing section, and the provided attribute information.

12. The image forming apparatus according to claim 11, wherein the region integration section integrates a plurality of regions having the same preset arbitrary attribute.

13. The image forming apparatus according to claim 11, further comprising:

figure/table link means for imparting a correlation to a figure/table number and figure/table data in text data in the image data, on the basis of text data and position information in the image data and figure/table data in which a figure/table number and a figure/table title are given as text data; and figure/table link display means for displaying a correlative positional relationship that is linked by the figure/table link means.

14. The image forming apparatus according to claim 10, further comprising:

figure/table link means for imparting a correlation to a figure/table number and figure/table data in text data in the image data, on the basis of text data and position information in the image data and figure/table data in which a figure/table number and a figure/table title are given as text data; and figure/table link display means for displaying a correlative positional relationship that is linked by the figure/table link means.

15. The image forming apparatus according to claim 14, further comprising:

a region integration section that integrates a plurality of regions on the basis of the image data of each region, which is subjected to the image process in the image processing section, and the provided attribute information.

16. The image forming apparatus according to claim 14, wherein the region integration section integrates a plurality of regions having the same preset arbitrary attribute.

17. The image forming apparatus according to claim 10, wherein the region grouping section groups a plurality of preset arbitrary regions.

18. The image forming apparatus according to claim 10, wherein the region grouping section includes a region grouping method determination section that determines which regions are to be grouped, on the basis of the image data of each region, which is processed by the image processing section, and the provided attributed information, and groups a plurality of regions on the basis of a determination result of the region grouping method determination section.

19. The image forming apparatus according to claim 18, wherein the region grouping method determination section includes a region character string information analysis section that analyzes at least a meaning of a character string in the region, and a figure/table group determination section that provides a group candidate on the basis of a positional relationship between a figure table and a figure number.

* * * * *